United States Patent [19]

Reboux et al.

[11] 4,224,494
[45] Sep. 23, 1980

[54] BRAZING PRESS FOR BRAZING CLADDINGS TO PRESSINGS INCLUDING A FLAT BOTTOM SURROUNDED BY CURVED PORTIONS

[75] Inventors: Jean Reboux; Joël Guilloteau, both of Paris, France

[73] Assignee: Tocco-Stel, Paris, France

[21] Appl. No.: 952,229

[22] Filed: Oct. 17, 1978

Related U.S. Application Data

[63] Continuation-in-part of Ser. No. 847,988, Nov. 2, 1977, abandoned, which is a continuation-in-part of Ser. No. 782,483, Mar. 29, 1977, abandoned.

[30] Foreign Application Priority Data

Oct. 5, 1976 [FR] France ............................ 76 29897
Jan. 31, 1978 [FR] France ............................ 78 02664

[51] Int. Cl.² .................. H05B 5/00; B23K 13/00
[52] U.S. Cl. .................... 219/9.5; 219/10.49 R; 219/10.73; 219/85 A; 228/106
[58] Field of Search .................. 219/9.5, 10.49, 7.5, 219/10.73, 85 A, 10.43, 10.53, 10.79, 160, 149; 228/243, 44.1 R, 106, 141.1, 142, 265, 212, 213, 237; 336/84 R, 84 C, 84 M, 55, 60, 62, 76

[56] References Cited

U.S. PATENT DOCUMENTS

| | | | |
|---|---|---|---|
| 2,266,424 | 12/1914 | Humphrey | 228/106 |
| 2,277,223 | 3/1942 | Goodridge | 219/10.79 |
| 2,406,310 | 8/1946 | Agule | 219/9.5 |
| 2,781,437 | 2/1957 | McArthur | 219/10.49 |
| 2,848,566 | 8/1958 | Limpel | 219/10.79 |
| 2,882,505 | 4/1959 | Feder | 336/96 |
| 3,045,095 | 7/1962 | Usher et al. | 219/10.79 |
| 3,335,212 | 8/1967 | Seulen et al. | 219/10.79 |
| 3,608,809 | 9/1971 | Cushman | 228/106 |
| 3,609,277 | 9/1971 | Dallet et al. | 219/9.5 |
| 3,632,948 | 1/1972 | Moulin et al. | 219/9.5 |
| 3,754,109 | 8/1973 | Moulin et al. | 219/9.5 |
| 4,016,389 | 4/1977 | White | 219/10.49 |

FOREIGN PATENT DOCUMENTS

| | | | |
|---|---|---|---|
| 2744861 | 6/1978 | Fed. Rep. of Germany | 228/243 |
| 73677 | 9/1960 | France | 219/9.5 |
| 2109276 | 5/1972 | France | 219/9.5 |
| 2105660 | 4/1972 | France | 219/9.5 |

*Primary Examiner*—B. A. Reynolds
*Assistant Examiner*—Philip H. Leung
*Attorney, Agent, or Firm*—Edwin E. Greigg

[57] ABSTRACT

A brazing press for securing exterior claddings to bottoms of metallic receptacles, which includes a support structure and a reciprocable mandrel for exerting pressure against the former. The support structure holds a massive inductor block having a flat bottom and containing an inductor coil for respectively pressing and heating the flat portions of the workpieces, and an encompassing sleeve which is associated with an auxiliary inductor and exerts pressure on the peripheral curved portions of the cladding. Either the sleeve with its auxiliary inductor of the inductor block can be supported by said structure through resilient means which are calibrated, whereby auxiliary pressure is exerted on the peripheral curved portions independently from the one exerted on the flat central portion, when said mandrel is pushed against the inductor block.

25 Claims, 9 Drawing Figures

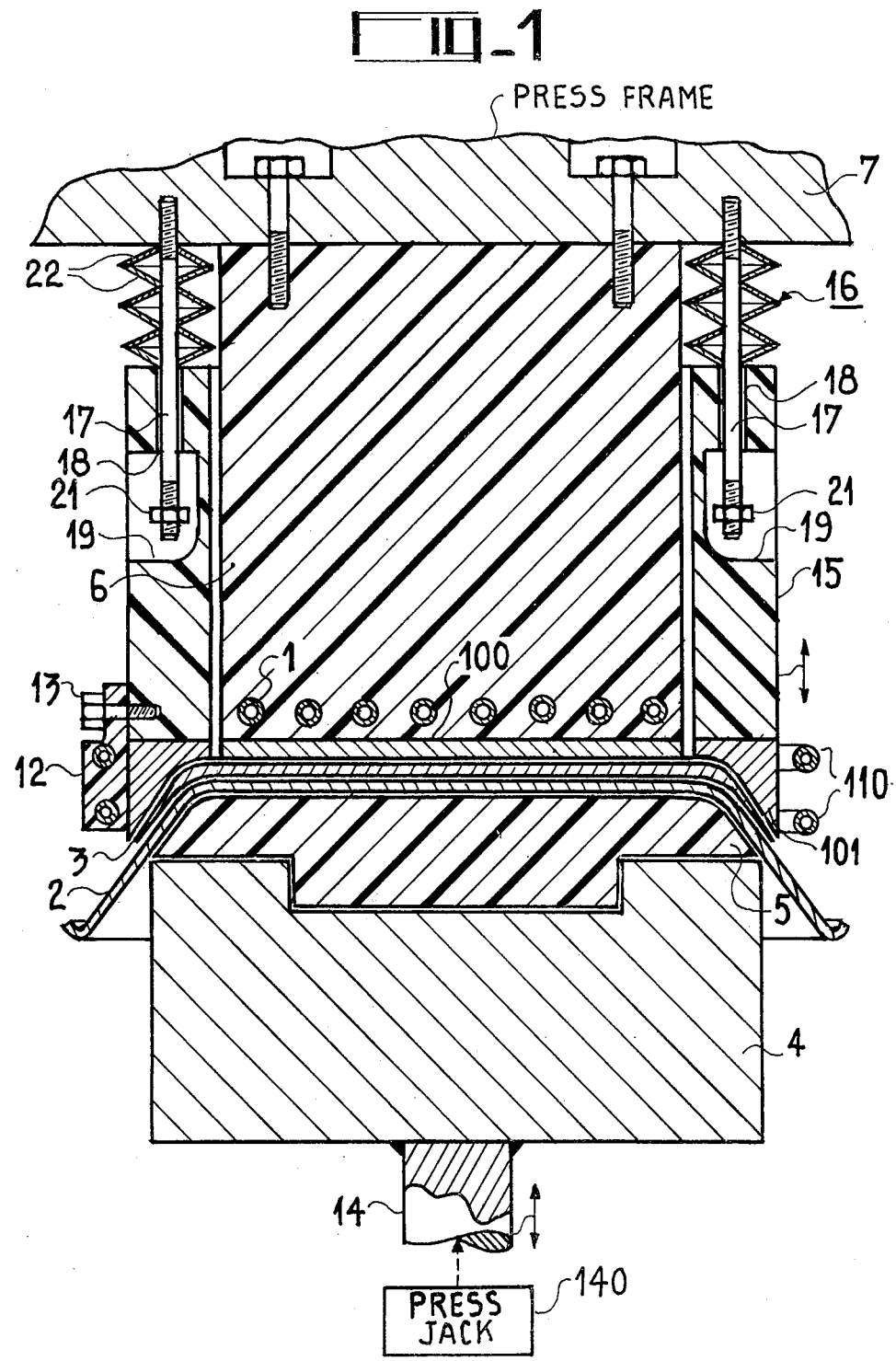

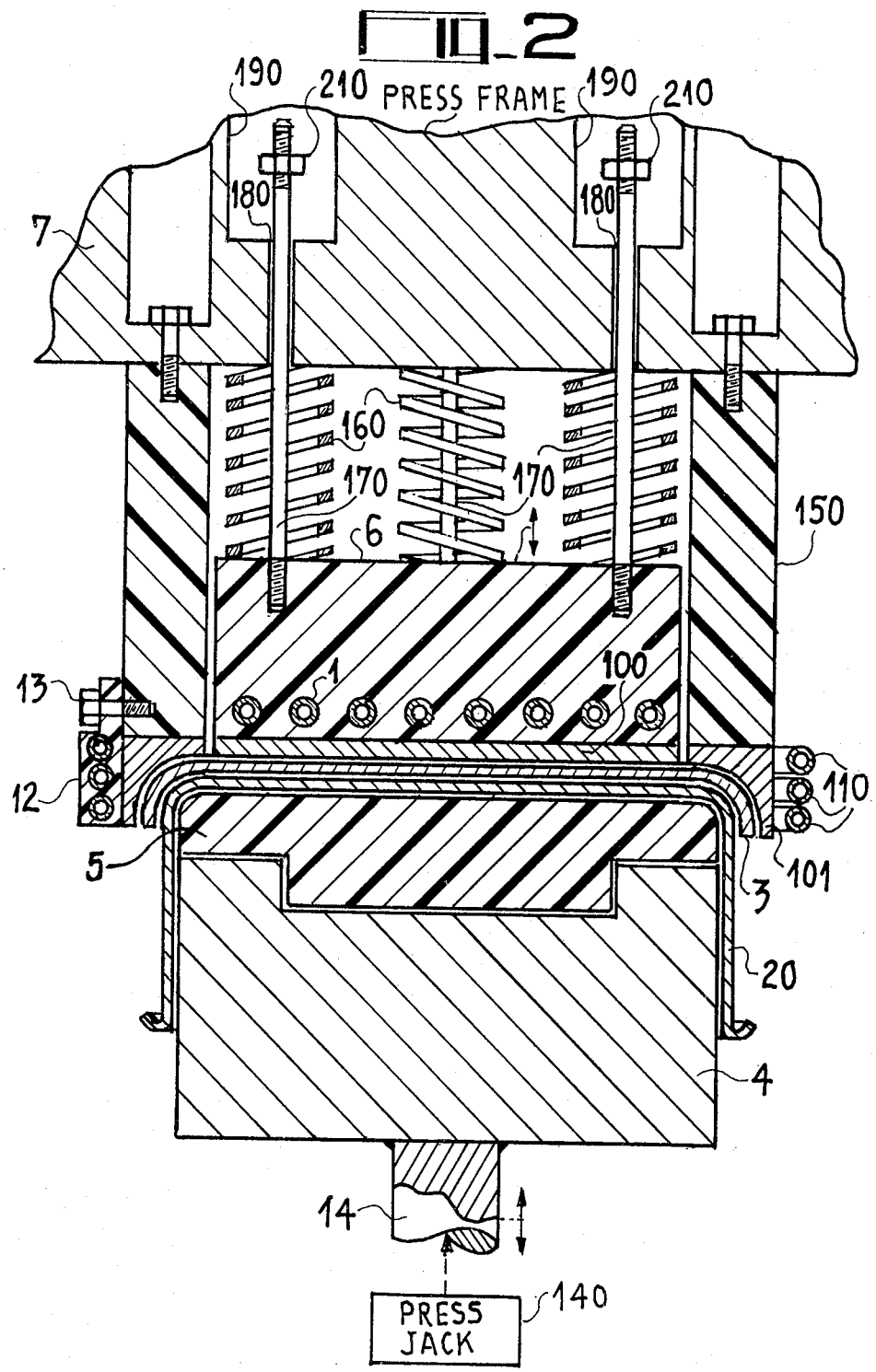

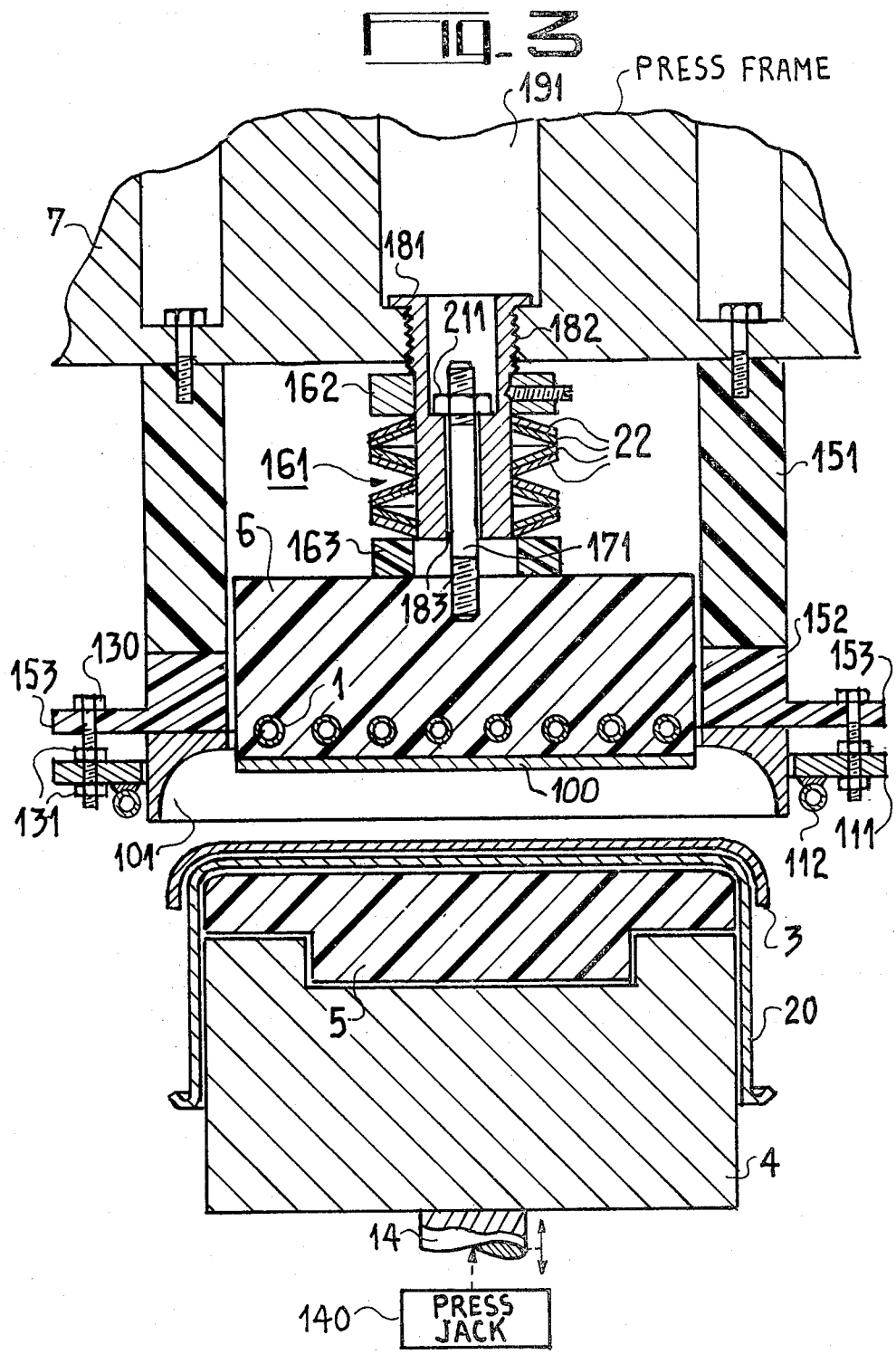

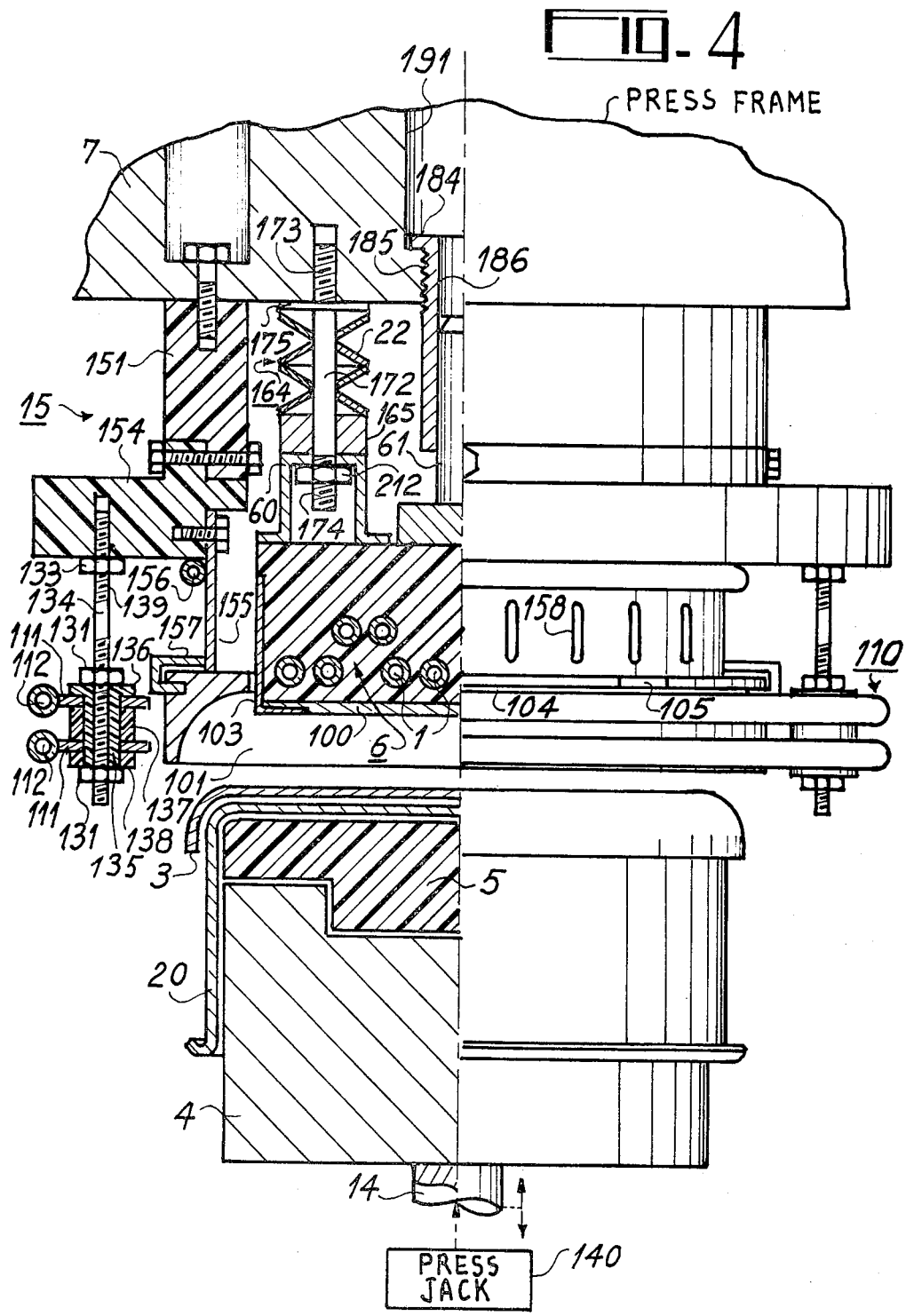

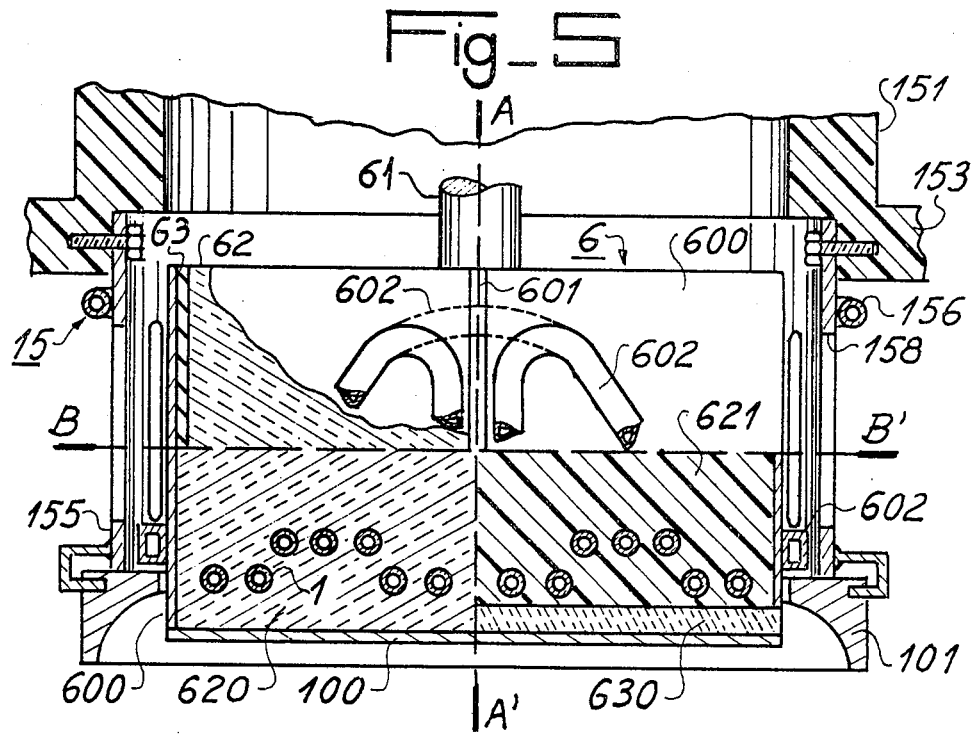
Fig_5
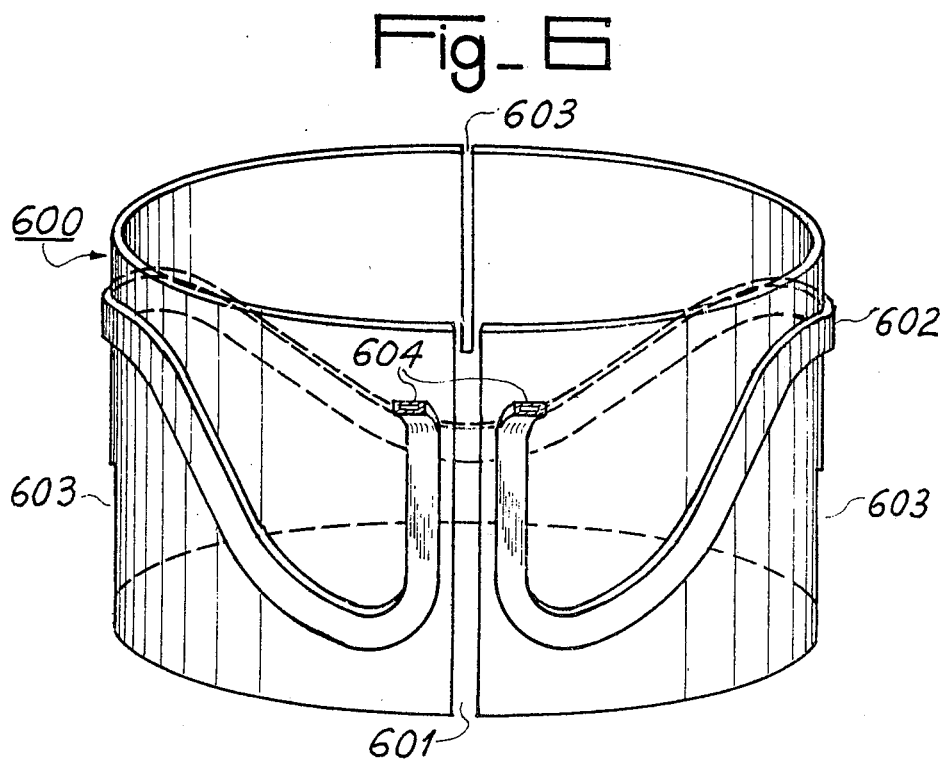
Fig_6

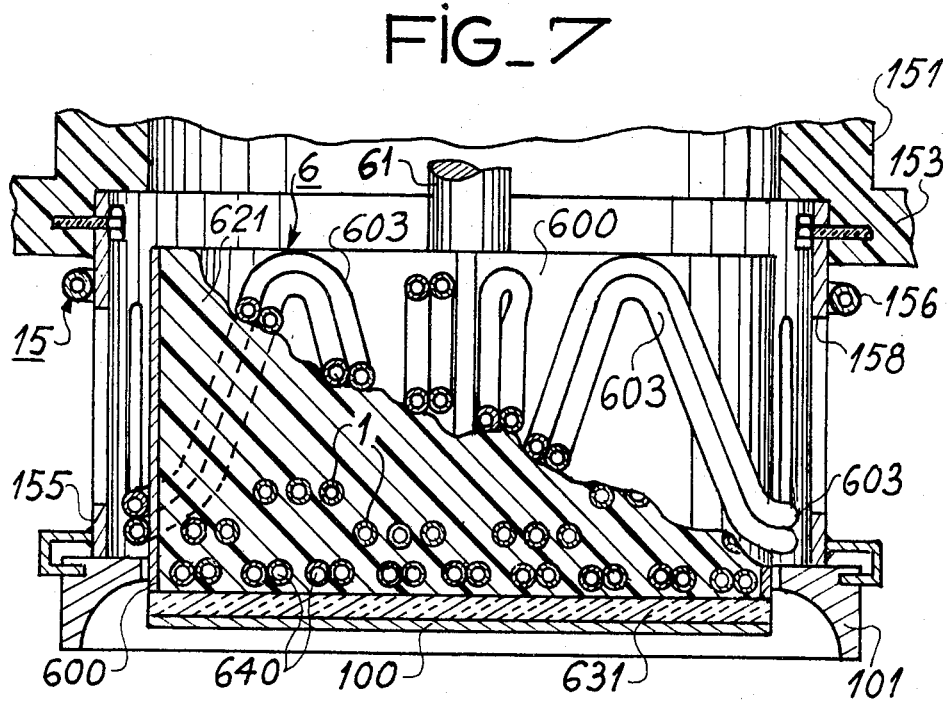
FIG_7
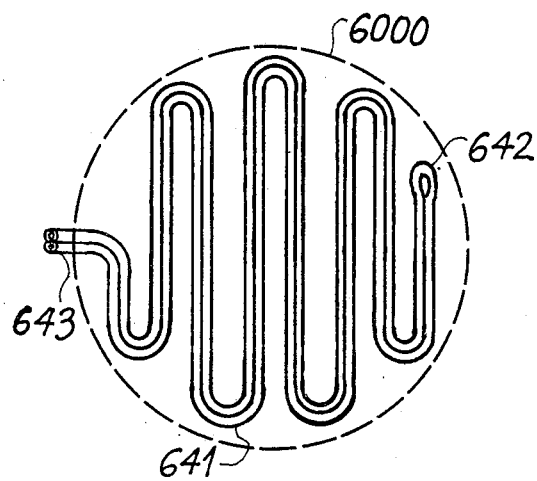
FIG_8
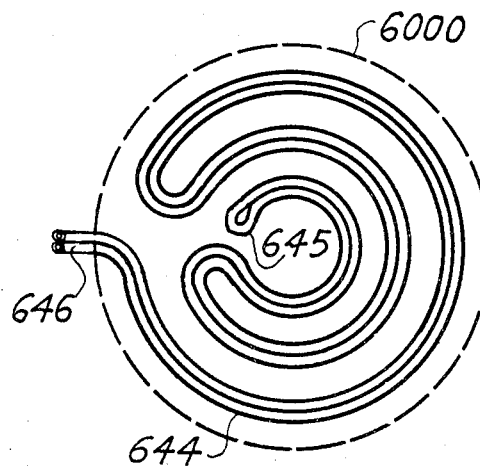
FIG_9

BRAZING PRESS FOR BRAZING CLADDINGS TO PRESSINGS INCLUDING A FLAT BOTTOM SURROUNDED BY CURVED PORTIONS

This is a continuation-in-part of U.S. patent application Ser. No. 847,988 filed Nov. 2, 1977 which is a continuation-in-part of U.S. patent application Ser. No. 782,483 filed Mar. 29, 1977, both now abandoned.

Reference to related U.S. Pat. Nos. 3,609,277 3,632,948 and No. 3,754,109, and to French Pat. No. 2,105,660, assigned to the present assignee, as well as to French Pat. No. 1,425,005 or British Pat. No. 1,064,903 and to French Addition Pat. No. 73,672.

BACKGROUND OF THE INVENTION

The present invention relates to brazing presses for brazing together two or more metal plates to obtain a stratified metal structure, more particularly it relates to presses for brazing together a first work-piece or pressing comprising a plane central portion and a peripheral curved or raised portion, and a second workpiece or cladding covering or lining the central part and at least partially the peripheral part of the first workpiece.

Such brazing presses are generally used in the manufacture of cooking vessels where it is advantageous to join together a drawn workpiece or pressing made, for example, of stainless steel and having a flat bottom and raised and curved side walls, and a workpiece so-called heat-diffusing cladding consisting of a good heat-conducting metal such as copper, aluminium or their alloys.

United States Patent to Dallet & al. filed July 13, 1970, Ser. No. 54.281 and patented Sept. 28, 1971 with the U.S. Pat. No. 3,609,277, assigned to the present assignee, discloses and illustrates in FIG. 1 a brazing press for connecting together a pressing or workpiece having raised edges, and a preformed heat-diffusing cladding whose surface facing the pressing also has raised edges matching in shape to those of the pressing. Brazing is effected by means of a single intermediate heating member of ferromagnetic material termed "susceptor" which has a special form, i.e., it comprises a slightly concave thin central part and thick raised edges whose surface facing the heat-diffusing cladding matches with the final outer form this cladding must take after being brazed onto the pressing. Pressure exerted by the press on the edges of the susceptor causes the edges to pivot, owing to the fact that the susceptor is concave, with respect to its center, and thus strongly pushes the raised edges of the heat-diffusing cladding against the facing portions of the pressing.

The press disclosed in the patent referred to above also comprises an auxiliary inductor which surrounds the edges of the susceptor, in order to make it possible to braze the peripheral curved parts.

Experience has shown that after a certain number of pressing and heating operations, a susceptor arranged in this way loses its concavity at its central part and it is necessary to remove the susceptor from the press and to re-form it in a correct way by applying, for example, pressure against its center, which results in production being interrupted during the time required for replacing the susceptor with a new one.

Furthermore, French Patent filed on Sept. 16, 1970, National Ser. No. No. 70-33585, in the name of the present Assignees and published on Apr. 29, 1975 under the U.S. Pat. No. 2,105,660, discloses a press for stamping a flat cladding placed onto a pressing having a flat bottom and raised edges so that the plate covers both the bottom and the edges, and for brazing them together. This press comprises a mandrel carrying the drawn workpiece, two coaxial jacks one of which carries at its lower end a rigid block incorporating the main inductor and the central flat part of the ferromagnetic susceptor. The first jack is operated first and presses the plane cladding against the flat bottom of the pressing. The second jack carries at its lower end a cylindrical rigid sleeve or case which surrounds the inductor block. The sleeve carries at its lower end the peripheral annular part of the susceptor, which is distinct from its central part and is designed both to match upon stamping with the periphery of the heat diffusing cladding facing the raised edges of the pressing, and to join them together by means of an auxiliary inductor surrounding the peripheral susceptor part from the outside.

Moreover, United States Patent to Moulin & al. filed on Aug. 16, 1972 under Ser. No. 281,763 and patented on Aug. 21, 1973 with U.S. Pat. No. 3,754,109, assigned to the present assignee, also discloses a brazing press for joining a preformed heat-diffusing cladding to a pressing or stamped workpiece for covering the flat bottom and the raised edges of it, in which in order to obtain close contact between the raised edges of the pressing and the periphery of the heat-diffusing cladding, supplementary pressure is exerted from below on the edges of the sidewall of the pressing so as to slightly deform it. This is obtained either by resilient means such as springs, or by means of a double-acting press (a press with two jacks). Supplementary pressure exerted on the jacket must be carefully correlated to the limit of elasticity because it is necessary to avoid both permanent deformation of the pressing and insufficient or total lack of deformation, for example, owing to weakening of the springs, the stamped pressing being generally very rigid. This results in an increase in the cost of the installation.

OBJECT AND SUMMARY OF THE INVENTION

A brazing press according to the present invention makes it possible to avoid the risk of permanent or insufficient deformation by exerting additional pressure not on the jacket but on the curved edges of the cladding without the need of using a double-acting press as in the Assignee's French patent referred to above.

Accordingly, it is a primary object of the present invention to provide a brazing press for joining together a pressing having raised or curved edges surrounding a flat bottom with one or more claddings, which are to cover the flat bottom and at least a portion of the curved or raised edges surrounding it. The press including a single jack or ram, whose rod is adapted to be coupled to a mandrel carrying the pressing, is made to exert two independent pressures respectively on the central flat portions of the pressing and the cladding and on their raised peripheral portions, by means of resilient mounting means coupling either an inductor block facing the central portions or a sleeve surrounding the inductor block and carrying intermediate heating means of ferromagnetic material of annular shape on its bottom, which is adapted to enter into contact with the peripheral portions, to the frame of the press, while the other element is fixed thereto.

It is another objet of the invention to provide a brazing press, wherein the sleeve surrounding the inductor block includes a lower portion made of a metal alloy of low thermal and good electrical conductivity to obtain a more uniform heat distribution between the respective central portions of the pressing and the cladding.

It is a further object of the invention to provide improved inductor block arrangements to the brazing press of the abovedescribed type, mainly when the inductor block is the mobile element and the sleeve or girdle surrounding it, is the fixed one.

These and other objects and advantages of the present invention will be more readily apparent from a further consideration of the following detailed description and of the accompanying drawings illustrating two preferred embodiments of the invention, in which:

BRIEF DESCRIPTION OF THE DRAWINGS

FIG. 1 shows an elevational cross-sectional view of a portion of a first embodiment of a brazing press according to the invention;

FIG. 2 shows an elevational cross-sectional view of a portion of a first version of a second embodiment of the brazing press;

FIG. 3 shows a cross-sectional view of a second version of the second embodiment;

FIG. 4 is an elevational view, partly in axial cross-section, of a preferred version of the second embodiment of the brazing press according to the invention;

FIG. 5 is an elevational view, partly in cross-section, of a portion of a brazing press substantially according to FIG. 4, showing different possible embodiments of the inductor block provided with an outer cooled metallic protective jacket which is split along a generatrix over its entire height in order to present an open circuit to the main inductor which it encloses;

FIG. 6 is a schematic perspective view of an advantageous embodiment of the protective outer metal jacket covering the sidewalls of the inductor block;

FIG. 7 is an elevational view, partly in cross section, of a portion of a brazing press according to one embodiment of FIG. 5, wherein the bottom of the inductor block made of a resinous material is protected by a cold screen in the shape of a serpentine of metal tubing inserted between the main inductor and the bottom of the block (potted therein), cooled by the flow of a fluid therethrough; and FIGS. 8 and 9 are plan views of two possible embodiments of the metallic serpentine enclosed within the inductor block, close to its bottom.

DESCRIPTION OF THE PREFERRED EMBODIMENTS

Turning now to the drawings, FIG. 1 shows a main inductor 1 of the brazing press, which makes it possible to join together two plates, the first of which comprises the bottom of a stamped workpiece or pressing 2 which is usually of stainless steel, and the second is a plate made of a good heat-conducting material designed to form a heat-diffusing cladding or cover 3, which consists for example, of aluminum or copper, which are to be joined together by the fusion of a brazing flux (not shown) of a metal alloy generally having a melting point slightly lower than that of the two metals having the lower fusion point (i.e. aluminum or one of its alloys) inserted between the two plates 2 and 3.

The pressing 2 is supported by a mandrel comprising a first and a second member. The first member 4 is fixed to a rod 14 of a press jack or ram 140 mounted on the frame of the press and consists of metal, whereas the second member 5, which is designed to come into contact with the bottom of the pressing 2 which is to receive the heat-diffusing cladding 3 secured thereto by brazing, is made of heat-insulating material, e.g., an asbestos-cement compound. The second member 5 of the mandrel is supported by the first member 4 and its upper end is complementally formed to match the shape of the inner bottom of the pressing 2.

The heat-diffusing cladding, lining or cover 3 is preformed, i.e., its surface facing the pressing 2 is shaped so as to match with the shape of the workpiece 2. The main inductor 1 is embedded in a plastic or a refractory material based on cement to form a rigid block 6. The block 6 is carried by a metal plate 7 integrally with an overhanging arm of the frame of the press in a known manner (not shown) so as to be disposed opposite to and coaxial with the mandrel 4, 5. The inductor block 6 may be protected against overheating (when it is not made of refractory material) by means of a cold screen and a heat-insulating plate (not shown) of asbestos-cement both placed, in a conventional manner, between the lower face of the block 6 and an intermediate heating element consisting of ferromagnetic material which has been denoted as a susceptor in the above-mentioned patents of the present Assignee.

The dimensions of the main inductor 1 substantially correspond to those of the flat portion of the bottom of the pressing 2, the inductor 1 substantially covering this flat bottom portion.

The main inductor 1 is of conventional type usually utilized for heating as uniformly as possible a plane surface, such as a flat spiral or "pancake" type inductor having a uniform or non-uniform pitch, or a conical or frustoconical spiral. It is also possible to use advantageously an inductor derived from the flat spiral as disclosed in the United States patent to Moulin & al. filed on July 13, 1970 under the Ser. No. 54,251 patented on Jan. 4, 1972 with U.S. Pat. No. 3,632,948, assigned to the present Assignee, wherein there is disclosed an inductor having a plurality of concentric turns connected in series and respectively located at different distances from the heating susceptor so as to obtain an essentially uniform heat distribution in the interface between the bottom of the pressing 2 and the heat-diffusing cladding 3. Since the heat-diffusing cladding 3 has raised edges which must also be brazed to the workpiece 2, the press has two distinct intermediate heating elements one of which, the element 100, is plane and forms the central part of the susceptor located below the main inductor 1, whereas the other, the element 101, is annular in shape and constitutes the peripheral part of the susceptor and surrounds the central part 100 and the curved periphery of the heat-diffusing cladding 3 as described in the Assignee's second and third mentioned patents referred to above.

In particular, the central part 100 of the susceptor comprises in this structure a flat plate having approximately the same dimensions as the flat portion of the bottom of the pressing 2, and thus as those of the inductor block 6. The lower face of this plate 100 is designed to come directly into contact with the upper face of the central flat portion of the heat-diffusing cladding or cover 3 and to be heated by the main inductor 1.

The peripheral part 101 of the susceptor is of annular shape and comprises here a lower face curved or inclined so as to match with the shape of the outer face of the raised edges of the heat-diffusing cladding 3, an upper flat face and a lateral outer substantially cylindrical (or possibly frustoconical) face. The two parts 100, 101 of the susceptor are made of substantially indeformable and slightly magnetic steel.

Since the main inductor 1, as disclosed in the Assignee's patents referred to above, is provided only for brazing the flat portion of the heat-diffusing cladding 3 to that of the pressing 2, it is necessary to provide an auxiliary inductor 110 for heating the peripheral annular part 101 of the susceptor, and thus for brazing the raised edges of the heat-diffusing cladding 3 to the curved portion of the workpiece 2 connecting the bottom to the side-walls of the latter. The additional inductor 110 includes a single turn or a plurality of turns arranged in helical (solenoid) form and is constituted, for example, by a tube of circular or rectangular in cross section, which may consist of copper, through which a cooling fluid flows. The tube is held by members 12, e.g. molded members which include a heat-insulating, preferably refractory, material by means of which the tube is fixed to an element 15 integral with the peripheral susceptor part 101 by means of screws 13. The additional inductor 110 must be disposed around and close to the lateral outer face of the peripheral part 101 of the susceptor, thus being coupled to the susceptor by surrounding it. The number of turns and the shape of the auxiliary inductor 110 and the intensity of the high frequency current flowing through it are determined so as to obtain uniform heat distribution in the entire interface between the heat-diffusing cladding 3 and the pressing 2. This is possible to obtain either experimentally, i.e., by brazing some samples and then disassembling them for examination, or by measuring the temperatures in this interface by means of thermocouples according to a method disclosed in the third U.S. Pat. No. 3,632,948 of the Assignee, mentioned above.

Further, the pressing shown in FIG. 1 comprises a flat central portion forming its bottom and a frustoconical side-wall (frying pan) connected to the bottom through curved portions which, together with the bottom, have to be joined by brazing to the heat-diffusing cladding 3. To replace the pressure exerted on the heat-diffusing cladding or cover 3 by the turning movement of the edges of the single susceptor described in the Assignee's first mentioned United States patent, which would make it possible to press the edge of the cladding 3 against the corresponding parts of the pressing, one acts, according to the present invention, upon the periphery of the heat-diffusing cladding 3 by exerting an auxiliary pressure on the raised edges thereof by means of the annular part 101 of the susceptor. The auxiliary pressure must be independent of that acting on the flat bottom portion of both the pressing 2 and the heat-diffusing cladding 3 in order to act independently on the periphery, while this periphery is being softened by heating.

To this end, the peripheral annular part 101 of the susceptor is rigidly mounted on the lower end of a cylindrical and hollow sleeve (or jacket) 15 which is made of an indeformable insulating material and which surrounds the inductor block 6, the sleeve 15 being mounted at its upper end on the supporting plate 7 by means of resilient compression means such as compensation springs 16. The resilient means 16 when compressed by the ascending movement of the jack and the mandrel 4, 5, develop the desired auxiliary pressure. The sleeve 15 may be made of ceramic material or in a more economical manner it may comprise resin-impregnated fibers, e.g., bakelized wood fibers or asbestos fibers embedded in a silicon resin.

It will be noted that resilient means may comprise a plurality of helical springs in the form of calibrated "coil" symmetrically disposed with respect to the axis of the inductor block 6 along a circumference surrounding the block 6 and having one of their ends resting against the support plate 7 and the other against the sleeve 15.

The total height of the sleeve 15 including the annular part 101 of the susceptor attached to it is chosen in such a way that when the springs 16 are fully compressed, the inner periphery of the lower face of the annular part 101 is situated above the lower face of the central plate 100 of the susceptor. Thus, an auxiliary pressure is exerted on the curved or raised periphery of the heat-diffusing lining 3 independently of the pressure exerted on the flat central portion due to the compression force of the calibrated springs 16.

Owing to the resilient suspension, the sleeve 15 is displaceable and in order to obtain correct operation in combination with the press assembly, the displacement of the sleeve 15 must be limited by guiding means to directions parallel to its axis, that is to say, from below upwards and from above downwards.

The guide means can be obtained, for example, by adapting the inner dimensions of the sleeve 15 to the outer dimensions of the inductor block 6 and by letting contiguous surfaces slide one with respect to the other. Another way of providing guide means is to make use of a plurality of vertical rods 17 rigidly mounted in the fixed support plate 7 fixed to the frame of the press, the rods 17 penetrating calibrated vertical holes or bores 18 formed in the sleeve 15 or in a member integral therewith. The rods 17 and the bores or holes 18 cooperate with one another and must be symmetrically disposed with respect to the axis of the sleeve 15.

It is possible to advantageously combine the guide means with the resilient suspension means in the manner illustrated in FIG. 1.

Such a combined assembly comprises rigid guide and retaining rods 17 formed with a screw thread at their two ends, one of which is screwed into the screw threaded holes in the fixed support plate 7 so that the rods 17 extend vertically and are arranged symmetrically about the axis of the block 6. The wall of the sleeve 15 is formed with holes 18 from its upper end, the holes 18 being situated and dimensioned so as to permit the rods 17 to be inserted in them and having sufficient length to provide correct guide action in the vertical direction. The lower end of the holes 18 opens into the recesses 19 which have dimensions sufficient to allow a check nut 21 to be screwed onto the screw threaded lower end and to permit full vertical movement of the sleeve 15 under the action of the jack pushing the rod 14. The check nuts 21 determine the lower position of the sleeve 15 and thus the position of the annular part 101 of the susceptor when no pressure is exerted.

The springs 16 which can be helical springs are inserted on the rods 17 before their location in the holes 18 of the sleeve 15 so as to be disposed between the plate 7 and the upper end thereof.

Experience has shown that it is expedient to utilize springs 16 each comprising a stack or pile of resilient elements or elementary springs 22 each of which may comprise a resilient washer being frustoconical in shape (termed "Belleville" washer in the trade) since their utilization makes it possible to vary the elasticity and the rigidity of the composite spring 16 by changing the orientation and/or the number of stacked elements 22.

FIG. 1 shows the elements 22 stacked or piled up in head-to-head or in alternately reverse orientation, thereby obtaining maximum elasticity and minimum rigidity. The elements 22 can also be piled up one inside the other or it is possible to combine or to alternate the two ways of assembling to obtain the desired parameters.

It will be noted that it is also possible and perfectly equivalent to place the springs 16 between the lower end of the sleeve 15 which is then reversed and fixed to the support plate 7, and the annular part 101 of the susceptor which then rigidly carries, for example, one of the ends of the rods 17.

The operation of the brazing press of FIG. 1 is as follows:

when the jack of the press is actuated, the rod 14 carrying the mandrel 4, 5 and assembly of the elements 2, 3 to be brazed are displaced upwards;

since the springs 16 are expanded, the peripheral part 101 of the susceptor is well below the central part 100 of the susceptor and first comes into contact with the curved periphery of the heat-diffusing cladding 3 of aluminum;

continuation of the ascending movement of the jack results in the springs 16 being compressed until the plane central portion of the lining abuts against the susceptor central plate 100 fixed to the block 6, the pressure force then exerted on the article having a diameter of about 200 mm may be of the order of 4 tons.

The auxiliary pressure on the periphery of the lining 3 is then exerted independently of the pressure exerted on its central portion by the suitably calibrated compensation springs 16 and can reach several 100 kg, which is sufficient for intimately applying the periphery of the lining 3 against the adjacent parts of the workpiece 2 when the aluminum reaches a temperature of about 580° C. and becomes easily deformable after a generator supplying the main inductor 1 and the auxiliary inductor 110 has been put in operation.

The workpiece 2 shown in FIG. 1 has a frustoconical side-wall (a pan) and thus there is no problem for separating the periphery of the heat-diffusing cladding 3 from the annular part 101 of the susceptor immediately after brazing. The same does not apply when the sidewall is cylindrical (a casserole) and when the cladding 3 has to cover the beginning of the latter. In that case, however, by taking advantage of higher expansion coefficient of the aluminum and of poor heat conductivity of the upper part 5 of the mandrel, the annular part 101 of the susceptor positively engages the periphery of the cladding 3 after brazing onto the workpiece and releases it only when the workpiece has been sufficiently cooled. This means that when the mandrel 4, 5 has been moved downards after brazing, the workpiece remains attached to the peripheral part 101 of the susceptor and this slows down the production rate. It would be possible to blow fresh air from below into the workpiece from the mandrel 4, 5 or from above onto the lining 3 via a cylindrical space provided to this effect between the inductor block 6 and the sleeve 15 to accelerate cooling, but althrough it is contemplated to do this, the time thus saved is not sufficient.

Accordingly, there is proposed a second embodiment of the brazing press according to the invention in which pressure is exerted on the periphery of the workpieces to be brazed independently of the pressure being exerted on their central portion and when the mandrel is moved backwards after brazing, a thrust is exerted on the central portion in order to push the brazed workpieces towards the mandrel notwithstanding the clamping action thereon by the annular part of the susceptor.

FIG. 2 shows a partial cross-sectional view in elevation of a first version of the second embodiment of the brazing press according to the invention. Parts similar to those shown and described in FIG. 1 will have the same numerals used in FIG. 2 and all new elements will bear different numerals.

In FIG. 2, the mandrel 4, 5 matches with the inner shape of the pressing 20 having a cylindrical side-wall (casserole) and an inductor block 6 and the central susceptor plate 100 joined to the bottom of the block 6 cover only respective flat portions of the bottom of the pressing 20 and of the heat-diffusing cladding 3, whose curved periphery reaches the beginning of the cylindrical side-wall of the pressing 20 and is thus caused to remain engaged by the annular part 101 of the susceptor after brazing.

To eliminate this disadvantage, use is made here of a solution derived from that illustrated in FIG. 2 of the first mentioned U.S. Pat. No. 3,609,277 assigned to the present Assignee, where the inductor block 6 can be made movable with respect to the fixed sleeve which surrounds the block and rests on the periphery of the susceptor in order to effect bending of the periphery of the lining 3 by means of the raised periphery of the susceptor consisting of a single piece. Such mobility has been disclosed in the above-mentioned prior patent by means of a spring which rests against the upper face of the inductor block.

In the second embodiment of the invention illustrated in FIG. 2, a sleeve 150 is fixed, at its upper end, to a support plate 7 (e.g. by means of screws) and carries, at its lower end, the peripheral annular part 101 of the susceptor and the auxiliary inductor 110 is designed to heat by induction this annular part. The inductor block 6 is mounted on the same support plate 7 by resilient means so as to be displaceable parallel to its axis of symmetry, so that the auxiliary pressure exerted on the respective flat central portions of the two workpieces 20, 3 to to be brazed together is independent of the pressure exerted on the raised or curved periphery.

The resilient means comprises in this case a set of helical springs in the form of a "coil" 160 symmetrically arranged with respect to the axis of the inductor block 6 between the inner face of the support plate 7 and the upper face of the block 6.

There are also provided guide means for the axial displacement of the inductor block, the guide means comprising rigid guide and retaining rods 170 having two screw-threaded ends one of which is screwed into the inductor block 6 and the other end penetrates through guide holes or bores 180 formed in recesses or cavities 190 provided in the support plate 7 where they locate a check nut 210 limiting the lower position of the inductor block 6 when the mandrel 4, 5 is moved backwards. The springs 160 are arranged to encircle each of the rods 170. The springs 160 can be replaced by frustoconical washers of "Belleville" type utilized in the first embodiment shown in FIG. 1 or by any other known type of spring.

The operation of the press according to the second embodiment of the invention is as follows:

when the jack is operated, the mandrel 4, 5 which carries the pressing 20 and the cladding 3 starts its ascending movement;

during this ascending movement the upper flat face of the heat-diffusing lining 3 is first brought into contact with the lower face of the central part 100 of the susceptor, the lower position of which is determined by the check nuts 210, is situated below the lower face of the adjacent periphery of the annular part 101 of the susceptor;

while the mandrel continues its ascending movement, the springs 160 are compressed and apply pressure on the plane central parts of the two elements 20, 3 to be brazed;

the mandrel 4, 5 then comes into abutting engagement with the fixed annular part 101 at the curved periphery of the bottom of the workpiece 20 and the periphery of the heat-diffusing cladding 3;

when, after a high frequency generator (not shown) connected to the auxiliary winding 110 has been put into operation and the periphery of the cladding 3 has reached a temperature of about 580° C., the pressure exerted by the jack causes deformation of this periphery so as to press it intimately against the adjacent parts of the pressing 20 during brazing;

As soon as heating has been terminated, the mandrel 4, 5 starts its descending movement and pressure exerted by the springs 160 on the flat central portion of the cladding 3 makes it possible to push the pressing 20 downwards and to disengage it from the clamping action of the substantially vertical surfaces of the annular part 101 of the susceptor without the need for waiting until it is cooled.

The two embodiments of the invention described above are equivalent because they both allow to obtain, by means of a single-jack press, two pressures independent from one another one of which acts on the flat central portion and the other acts on the curved edges of the assembly comprising the elements to be brazed 2 (20) and 3.

FIG. 3 shows a partial axial cross-sectional view in elevation of a second version of the second embodiment illustrated in FIG. 2, where the jaws (block 6, mandrel 4, 5) of the press are spaced from each other.

Parts similar to those shown and described in FIGS. 1 and 2 will have the same numerals used in FIG. 3 and all new elements will bear different numerals.

In FIG. 3, resilient coupling means 161 between the inductor block 6 and the support plate 7 comprise a single assembly of frustoconical washers ("Belleville") which are stacked or piled up in pairs of alternatively reversed washers so as to obtain a calibrated assembly according to requirements. The single assembly 161 is coaxially arranged with respect to the inductor block 6 and is inserted on guide means which comprise a hollow sleeve 181 having its upper end screwed in a screw-threaded hole 182 formed in the bottom of a recess 191 in the support plate 7 and a guide and retaining rod 171 disposed along the axis, and fixed to the upper end of, the block 6. The rod 171 is inserted in the cavity 182 of the sleeve 181 in a calibrated manner and its upper end is screw-threaded so as to locate a check nut 211 which determines a lower position of the block 6 and thus the length of its stroke. Furthermore, the composite spring 161 has its lower end resting against a first annular ring 163 of heat insulating material and its upper end resting against a second annular ring 162 that is placed around the sleeve 181.

The sleeve 151 surrounding the inductor block 6 is fixed at its upper end to the support plate 7 and carries at its lower end the peripheral annular part of the susceptor 101, comprises two parts fixed to each other, the upper part 151 which comprises a heat insulating non-refractory material (e.g. bakelized wood), and the lower part 152 adjacent to the annular part 101 of the susceptor which includes a heat insulating refractory material such as asbestos fibers embedded in a resin based on silicons (sold in France under the trade name of "SYN-DANIO"). The lower part 152 of the sleeve comprises an integral flange portion 153 which surrounds it and carries the auxiliary inductor by means of screws 130 and nuts 131.

The auxiliary inductor disclosed herein comprises a single coil in the form of a solid conductor ring 111 which is open and surrounds at a short distance the side wall of the peripheral part 101 of the susceptor. The ring 111 carries a tube 112 of the same material (copper) which is attached thereto by brazing and through which a cooling fluid flows.

The principal advantage of this second version is the readiness with which the stroke of the inductor block 6 is adjusted by means of a single screw 211 as well as the adjustement of the auxiliary pressure by different arrangements of the stack of washers 22 which form a single spring 161.

It is also possible to improve the operation of a brazing press by making the temperature distribution more uniform across the interface between the bottom of the pressing or stamping (2 or 20) and the heat-diffusing cladding 3, while they are being brazed.

One of the possible ways of making such an improvement is disclosed in a French Pat. No. 1,425,005 patented Dec. 6, 1965, or in the corresponding British Pat. No. 1,064,903, published Apr. 12, 1967, where the use was proposed, in a brazing press for brazing together two or more flat circular plates of different diameters, of an inductor in the form of a flat spiral (called a "pancake coil") of large diameter, and of a set of interchangeable windings consisting of single shortcircuited turns of different diameters one of which is arranged around the plates to be brazed in the same plane as, and co-axially with, the plates, so as to form a screen by masking those turns of the inductor whose dimensions exceed those of the plates and in this way to ensure uniform distribution of the heat generated by the alternating magnetic flux which passes through then.

The above-mentioned French or British Patent teaches that a flat pancake-type coil provides a heating effect which has a minimum in a region adjacent its center and maxima at its periphery. A conducting ring which forms a short-circuited turn, placed concentrically with the flat spiral coil and located at a distance from the plate or plates to be heated by the coil and placed adjacent one side thereof, provides a reduction of the temperature maxima at the edges so as to render the temperature distribution in the radial direction more uniform.

Experience has shown that the annular peripheral part of the susceptor to some degree performs the same function as the short-circuited loop in relation to the main inductor, but since it offers by no means negligible resistance to the induced current when heated, and because it is arranged below the main inductor, the temperature equalizing effect at its edges is inadequate.

FIG. 4 is an elevational view, partly in cross-section, of a preferred version of the second embodiment of the invention which improves the uniformity of temperature at the periphery of the plates to be brazed, by using a metallic supporting part of cylindrical shape surrounding the main inductor to carry the annular peripheral part of the susceptor.

The preferred embodiment of brazing press according to the invention, which is shown in FIG. 4, will thus be chiefly characterized by the fact that it also includes, inserted between the insulating sleeve and the annular, peripheral part of the susceptor, to each of which it is attached, a cylindrical supporting part made of a metal alloy of low thermal conductivity which surrounds the main inductor block, in order to make more uniform the alternating magnetic flux which is generated by the main inductor in the plane central part of the susceptor.

In the preferred embodiment of FIG. 4, the resilient connecting means 164 between the inductor block 6 and the support plate 7 are formed by at least three sets of stacked frustoconical washers 22 (Belleville washers) which are symmetrically arranged relative to the axis of the inductor block 6. The spring washers 22 are threaded onto mounting means formed by rods 172 which are threaded at both ends, the upper ends 173 being screwed into tapped holes in the support plate 7 and the lower ends 174 being inserted in suitable holes in U-shaped coupling brackets 60 attached to the upper face of the inductor block 6, being retained therein by check nuts 212 whose position determines the travel of the block 6. At the top, stacked springs 22 bear against a collar 175 secured to rod 172 and at the bottom they bear against a hollow cylindrical block or spacer 165 which is slipped onto rod 172 and whose height is selected in accordance with the number of stacked washers 22 and the manner in which they are stacked, so that the required pressure can be obtained.

Means for guiding the axial movements of the inductor block 6 are formed in the present case by a single assembly situated on the axis of the block, which comprise a hollow sleeve 184 whose upper end is screwed into a tapped hole 185 formed in the bottom of a recess 191 in the support plate 7, and a guide rod 61 arranged on the axis of the block 6 which is secured to the upper end thereof. The rod 61 is a matched fit in the bore 186 is sleeve 184.

In the present case the sleeve 15, which is attached at the top to the support plate 7 and surrounds the inductor block 6 and carries the annular peripheral part of the susceptor 101 at the bottom, is in three parts which are secured together. The upper one 151 of these parts is made of a non-refractory insulating material (bakelized wood for example) and the lower one 155 adjoining the annular part 101 of the susceptor is, according to the preferred embodiment, made of a refractory metal alloy of low thermal conductivity and high mechanical strength, such as an alloy of nickel and other metals such as chrome, iron and/or molybedenum for example.

An alloy of this nature consisting of nickel (70 to 80%), chrome (17 to 14%) and iron (10 to 5%) is widely marketed under the name "INCONEL" (registered trade mark of The International Nickel Co., Inc.) and it has a relative magnetic permeability close to that of brass (1.003 to 1.007) and a thermal conductivity of around substantially a thirtieth of that of copper, thus restricting heat losses by thermal leakage. These losses are also restricted by the fact that the alloy is of high mechanical strength, which enables the thickness of the lower part 155 of the lower part 155 of the sleeve to be reduced, this portion being in the shape of a thin but virtually undeformable metal ring or girdle.

The metal girdle 155 is attached at the top to an intermediate part 154 which forms a flange (or directly to the upper part 151), and, when part 154 must not be exposed to heat (being bakelized wood, for example), the top of the girdle 155 has brazed to it a metal tube 156 (of copper for example) through which a cooling fluid flows.

At the bottom, the Inconel girdle 155 carries the annular part 101 of the susceptor, which is either attached to it directly by means of screws or rivets for example, or else is detachably connected by means of U-shaped clips 157 or lugs made of a non-rusting refractory metal, which are secured at one end to the girdle 155 and whose other ends are free and are passed through cut-outs 105 into an annular groove 104 formed in the cylindrical outer wall of the peripheral part 101 of the susceptor. The detachable mounting of the peripheral part 101 of the susceptor on the lower part 155 of the sleeve 15 of the support, has the advantage that it enables stampings 20 of various shapes (saucepans or frying pans) to be brazed to heat-diffusing claddings 3, which may likewise be of various shapes and thicknesses but of closely related diameters, using one and the same inductor assembly, and the ease of the replacement of this annular part 101 in the event of breakage or wear.

Because, in relation to the main inductor 1 which it surrounds and the auxiliary inductor 110 which surrounds it, the closed girdle 155 constitutes a short-circuited coil carrying an induced current, whose effect is to form a screen and to reduce the intensity of heating at the periphery of the central flat portions of the bottoms of members 3 and 20 and thus to cause the temperature distribution to be more uniform, the path for the induced current needs to be concentrated in certain regions. It is therefore sometimes advantageous to form in the girdle oblong, axially orientated, vertical slots 158, whose number, length and position are determined by experiment when the reduction in temperature at the periphery is found to be too great with a solid girdle 155 (in the case of articles of small diameter for example). Between the upper insulating part 151 and the lower conductive part 155 of the sleeve, is inserted an intermediate part 154 which forms a radially projecting flange which is intended to carry the auxiliary inductor 110 by means of threaded rods 134, nuts 131 and 133, and parts made of insulating material which come into contact with the metal parts of the auxiliary inductor. These insulating parts comprise a sleeve 135 provided with a collar 136, which is threaded onto the threaded rod 134, and two washers 137, 138 of which the first 137 is rigid to set the spacing between the coils of the auxiliary inductor 110 and of which the second, 138, together with the collar 136 on sleeve 135, serves to insulate the inductor 110 from the nut 131. The thread 139 at the top of rod 134 is screwed into a tapped hole in the central portion of the sleeve 15 which forms the flange 154, which is preferably likewise made of a non-refractory insulating material (a plastic material or a composite material formed from polymerizing resins and glass, textile or wood fibers for instance).

It should be noted that the insulating upper part 151 and the insulating intermediate part 154 (the flange) of the sleeve 15 may be all in one piece, with a considerable amount of material being lost during machining.

In the preferred embodiment of FIG. 4, the auxiliary inductor 110 which is coupled to the annular peripheral part 101 of the susceptor is formed by two superimposed coils consisting of two solid conductive rings 111 which encircle the lateral wall of the peripheral part 101 of the susceptor at a short distance from it. At its periphery, and brazed to it, each ring 111 carries a tube 112 of the same material (copper) through which a cooling gluid flows.

From a single-jack press, it is possible in accordance with the present invention to obtain two mutually independent pressures which act, on the one hand, against the flat central portions of the members 20 and 3 to be brazed, and on the other, against their curved edges.

It should also be noted that the metal supporting girdle 155 for the annular peripheral part of the susceptor 101 may also be used in the first embodiment of the invention shown in FIG. 1, where it is the sleeve 15 which is coupled to the frame of the press by resilient means 16 and the inductor block 6 is fixed.

The flat central part 100 of the susceptor is held adjacent the bottom face of the inductor block 6 (with an eventual disk of refractory material containing asbestos inserted therebetween) by means of L-shaped brackets 103 secured to its sidewall.

FIG. 5 is an elevational view, partly in cross-section, of a part of the press, in particular the inductor block 6 when fitted with a metal jacket according to the present invention.

In one of the embodiment shown in FIG. 5, the rigid block 6 enclosing the main inductor 1 comprises a body 62 made of a refractory cement-based insulating material composed of zirconium ($ZrO_2$), silica ($SiO_2$), and possibly alumina ($Al_2O_3$), which is cold-cast in a mold. The side-wall 63 of the mold is made of an organic insulating thermosetting resin such as urea-formaldehyde or phenolformaldehyde (Bakelite). Its bottom may be formed directly by the steel plate which forms the flat central part of the susceptor 100, and its top may be covered over by another plate (notshown), which is similarly made of a non-refractory insulating material.

Since the cement-based compound forming the body 62 is a friable material when it has set, it may be necessary to form the side-wall 63 of the mold as a protective jacket held securely to it when it is fitted to the press. When the inductor block 6 is in its lowered position, an annular portion 70 of the protective jacket 63 is situated opposite and close to the inside circumference of the peripheral part 101 of the susceptor. This part, when production are at their normal level rates, is continuously maintained at a temperature of between approximately 600° and 800° C. and, because of this, it heats the adjacent jacket portion facing it, by radiation above the limit represented by the heat resistance of the material of which it is formed (150° C.).

The same phenomenon of thermal attack on or decomposition of the annular portion of the side wall occurs whenever the inductor block 6 is composed entirely of a thermosetting resin based on urea, phenol, aniline, alkides or epoxides, even when these contain inorganic fillers which render them more resistant to heat.

The object of the present invention is to overcome this failing of this type of inductor block 6, when it is used in a press according to the preferred embodiments of FIGS. 3 and 4 by enclosing the inner jacket 63 in an outer metal jacket which is split over its entire height and which is cooled, and whose presence makes it easier to attach the flat central part of the susceptor 100 against the flat bottom of the block, which bottom must be refractory even if the body of the block 6 is made of resin.

In FIG. 5 are shown three possible embodiments of the inductor block 6 according to the present invention, in three quadrants which are defined by two mutually orthogonal axes AA' and BB', the fourth quadrant partially illustrating by means of an elevational view an outer protective, metal jacket 600 enclosing the body of the block 6, of whatever material the latter may be composed.

In quadrant AB, which is situated at the top left of FIG. 5, can be seen a first version of the block 6 as described above, which comprises a body 62 of refractory cement surrounded by a first inner cylindrical jacket 63 of thermosetting resin, which is itself enclosed on the outside by a second, metalic protective jacket 600 made of a metal which is a good conductor of heat, such as copper. This metal jacket 600, which is shown in section and partly broken away in the present case, is provided with a serpentine-shaped metal tube 602, which may be of rectangular cross-section, which is brazed to its outer face and through which flows a cooling fluid, such as water. It is also provided with a slot 601 which extends over its entire height along one of its generatrices so as to form an open conductive loop in relation to the main inductor 1, which it surrounds.

In quadrant BA', which is situated at the bottom left, the split metal jacket 600 is directly in contact with the body 620 of the block 6 and may thus advantageously form the side-wall of the mold in which the block 6 is formed by casting. The refractory cement which is generally used in this case is composed of 60% zirconia, 20% alumina and 20% silica, approximately, and water is used as the solvent. Having a granular size of 30 to 100 microns, a cement of this kind has the disadvantage of shrinking considerably in the course of setting and because of this cracks are formed, the number of such cracks depending on the mass of the body 620, and thus results in relatively poor electrical characteristics.

A more homogeneous composition, comprising up to 95% of zirconia and traces of silica, with a smaller granular size of from 10 to 20 microns, and with alcohol used as the solvent, gives a cement which has better mechanical strength (resistance to repeated shocks). Its major drawback is the formation of fissures even right through the block, particularly in the case of accelerated drying (in an oven).

It may be mentioned here that if refractory cement is used for the body 620, it is possible to produce a divided metal jacket 600, directly in contact with the body, from a more refractory, non-magnetic metal, even if it is a poor conductor of heat, such as nickel-based alloys, and even without a cooling tube. It is also advantageous to reinforce the circumference and bottom of the base of the cement block with a silica tape or fiber impregnated with the same cement as forms the body 620.

The disadvantages represented by the friability, fragility and high shrinkage factor (contraction), may be avoided by using, for example, a polymerizing resin of the epoxide type which can be made to set under cold conditions with the help of a hardener, such for example as the resin which is marketed under the name "Araldite" (registered trademark) by the CIBA-GEIGY company.

Such a version of the body 621 of the inductor block 6 is shown in quadrant B' A' in FIG. 2, which is situated at the bottom right of FIG. 5, where the divided metal jacket 600 surrounding the side-wall of the body 621, which may form the mold for the cold-casting of the body, is preferably made of copper and must be cooled by means of a serpentine metal tube 602 brazed to its outer face.

The bottom of the resin body 621 must also be protected from the heat which is generated by the main inductor 1 in the flat central part 100 of the susceptor, from which it must be separated either by a cold screen formed by a flat serpentine of metal tubing which is cooled and by an asbestos-based plate, the two being superimposed, as is described in the U.S. Pat. No. 3,632,948 mentioned above, or, as illustrated in FIG. 5, by a plate 630 made of a machinable vitroceramic material which is of high mechanical strength, high heat resistance and low thermal conductivity, and which is a good electrical insulator, such for example as the material comprising approximately 85% silica and 10% alumina which is marketed under the name "MACOR" (registered trademark) by the Corning Glass Corporation. Given that the distance between the plane tangent to the lowest turns of the main inductor 1 and the upper face of the plane part 100 of the susceptor is of the order of 20 millimeters, the thickness of the plate 630 may be up to approximately 12 to 15 millimeters. A second plate (not shown) made of an asbestos compound may advantageously be inserted between the central part 100 of the susceptor and the vitroceramic plate 630, to provide increased protection for the bottom of the resin body 621.

FIG. 6 is a perspective view of an advantageous embodiment of the metal protective jacket 600 for the side-wall of the body of the inductor block 6.

In addition to the main slot 601 which extends over its entire height and the serpentine metal cooling tube 602 which is brazed to its outer face, the metal jacket 600 in FIG. 6 also has partial slots 603 in the form of narrow crenellations, which are preferably situated at the points where the crests of the serpentine tube 602 are situated, on the opposite side therefrom. Because of this, these additional slots 603 extend alternately from the top and bottom of the tubular jacket 600 for example, preferably for more than half its height, and they make it possible to restrict losses due to eddy currents which are induced in the jacket 600 by the main inductor 1. The two ends 604 of the serpentine cooling tube 602 are provided with conventional end-pieces (not shown) which enable them to be connected to a cooling circuit by means of flexible pipes of an insulating material (reinforced natural or synthetic rubber), which are necessary by the axial movement of the inductor block 6.

To resume, the divided metal jacket 600 which protects the inductor block 6 has many advantages over the embodiments in the main patent and also over that in the Assignee's aforementioned French Pat. No. 2,105,660, where the sidewall of the inductor block 6, which is movable axially independently of the annular peripheral part 101 of the susceptor by means of two independent jacks or rams, is repeatedly liable to come close to the inside circumference of the latter and to be thereby heated by radiation. Apart from increasing the reliability of the inductor block 6 by providing it with improved protection against this undesirable heating, the lateral cold screen formed by the metal jacket 600 may also be electrically connected to earth (zero potential) in order to increase the safety of the personnel responsible for operating and maintaining the brazing press, and it gives the block 6 as a whole better mechanical strength whether its body is made of refractory cement or thermosetting or polymerizing resin, the body being under severe strain from high pressure stresses and from thermal shock in the absence of such a screen.

It may be noted here that the height of the cooled metal jacket 600 may be reduced in such a way that it covers only the base of the inductor block 6 at its part close to the lower limit of its axial movement, at the cost of sacrificing some of the above-mentioned advantages.

In the third embodiment of the inductor block 6, shown in the quadrant B'A' of FIG. 5, the bottom of the block body 621 made of a resinous material was thermally protected from the heat developed in the central portion 100 of the susceptor, by means of a disc or plate 630 made of a machinable vitroceramic material. This material is relatively costly and it may become, if the press is used at extremely high production rates, heated to temperatures above the maximum allowable temperature of the resinous material forming the body 621. It is also less shockresistant then the resinous material or an asbestos compound.

These drawbacks may be overcome by inserting a cooling arrangement inside the body 621 of the block, close to its bottom, as taught in French Addition Pat. No. 73,672 patented on Sept. 5, 1960, which is an addition to French Pat. No. 1,166,952 published on Nov. 18, 1958, teaching a brazing press for producing cooking vessels having a laminated bottom, at a high rate.

FIG. 7 shows an elevational view, partly in cross-section, of a portion of a brazing press of the embodiment shown in FIGS. 4 and 5, including the inductor block arrangement 6 having a body 621 of resinous solid material, encircled by an outer protective metal jacket 600 which is split over its entire height and cooled by a metallic tubing 603 brazed to its outer face, wherein the inductor block body 621 contains a cold screen made up from a flat serpentine of a hollow metallic tubing.

This metallic tubing 640 of serpentine shape is inserted within the body 621 of the block 6, between the main inductor 1 and the central flat portion 100 of the susceptor, at close proximity to its bottom, and is arranged in such a way as to be substantially electromagnetically transparent to the high-frequency magnetic field produced by the flat spiral inductor 1, when it is fed by a generator (not shown). This serpentineshaped tubing 640 is preferably made of two contiguous copper tubes electrically connected together by at least partial soldering or brazing together of the adjacent and contracting zones of their respective sidewalls. These tubes may be of circular, square, rectangular, oval (flattened) or elliptical cross-section for example. One of the ends of this double tubing projects outside the body 621 of the block 6, while the other one, at which end the two contignous tubes are hydraulically interconnected to form a continuous path for the flow of a cooling fluid, remains potted within the body 621.

The serpentine-shaped tubing 640, located inside the body 621 adjacent its bottom face is mainly provided to cool this latter, as well as the top face of a refractory thermally insulating disk or plate 631 inserted between this bottom face and the central portion 100 of the susceptor, to provide a temperature gradient therebetween. This refractory disk 631 is preferably made of an asbestos-based compound, such as for example a compound of asbestos fibers with a silicon-based, temperature resistant resin, sold in France under the trade name of "SYNDANIO", which is much less costly and more shock resistant than the vitroceramic plate 630 of FIG. 5. Moreover, due to the presence of the cold shroud formed by the serpentine-shaped tubing 640, the thickness of the refractory plate 631 is much less than that of the vitroceramic one 630 of FIG. 5 (12 to 15 millimeters) to obtain the same temperature gradient of about 700 degrees centigrade, a thickness or height of about 4 to 6 millimeters of asbestos compound will thus be sufficient.

It is to be noted here, that the outer metallic jacket 600 advantageously provides the sidewalls of the mold into which the body 621 of resin is cast, thus providing a structure for mounting the main inductor 1 and the serpentine-shaped tubing 640 with the help of insulating spacers preferably made of the same resin as the body 621.

The outward projecting extremity of the serpentine-shaped tubing 640 is preferably electrically connected to the metallic outer jacket 600, which may be grounded to protect the press operator and maintenance personnel. In a preferred embodiment of the inductor block 6, this extremity is also hydraulically connected to the tubing 603 cooling the outer jacket, which is then also made of two parallel, contiguous tubes.

In FIGS. 8 and 9, two possible embodiments of the serpentine-shaped tubing 640 for cooling the bottom of the inductor block body 621 have been represented in plan views.

FIG. 8 shows a plan view of a first embodiment of the cooling serpentine tubing 640, wherein the serpentine 641, which will be called here of the linear type, is of a meandering shape composed of a plurality of straight parallel portions of varying lengths, connected together by U-shaped or hairpin-shaped portions, the whole being contained within the outline 6000 (dashed circle) of the body 621.

The linear serpentine 641 is formed by two contiguous copper tubes, electrically and mechanically joined together over their entire lengths, one of the tubes conveying the coolant fluid in one direction and the other in the opposite direction. Therefor, the inner end 642 of the serpentine tubing 641, comprises a folded portion of U- or hairpin-shape, whose respective ends connect those of the two contiguous tubes to provide a closed hydraulic loop or continuum therebetween, this end 642 being electrically insulated.

The outwardly projecting end 643 of the serpentine tubing 641 is, as mentioned above, preferably connected to the tubing 603 which is fixed to the outer face of the metallic protective jacket 600.

FIG. 9 is plan view of a second embodiment of the serpentine-shaped tubing 640 of FIG. 7. This serpentine 644 which will be called of the circular type, comprises portions in the shape of concentrically disposed circular arcs of different radii, contained within the outline 6000 of the body 621, electrically and hydraulically connected together by U- or hairpin-shaped portions. More precisely, each of the circular arc portions represents an open loop or turn, whose one end is connected to the adjacent end of the one which it surrounds and whose other end is connected to the adjacent end of the loop which it is surrounded by, by means of the aforementioned U-shaped portions so that the electromotive force induced by the magnetic field of the main inductor 1 in two neighboring loops is of the opposite phase or sign and is subtracted from one another.

Here too, the inner end 645, which is located near the center of the bottom of the body 621, is insulated and includes a U-shaped connecting link to ensure the hydraulic continuity of the two contiguous tubes. The outwardly projecting end 646 is also preferably connected to the tubing 603 for cooling the metallic jacket 600, in the same way as mentioned before.

The invention is not limited to the embodiments described above and shown in the accompanying drawings representing those, which at the present time appear the most advantageous, but alsocover equivalents which are within the capacity of the man skilled in the art, such for example as using refractory cements or thermosetting resins of compositions different from those mentioned above to produce the body of the block 6, and using metals other than copper or its alloys to produce the metal outer protective jacket 600.

The invention is applicable in particular to the brazing of heat diffusing claddings made of a good heat conducting material such as aluminum or copper, to stamped cooking vessels of stainless steel (sauce-pans, frying-pans or pressure-cookers). It is also possible to braze two or more claddings to the same workpiece to obtain a multilayer structure (stainless steel, aluminum or copper and steel).

What is claimed is:

1. A brazing press for assembling receptacles having a layered bottom portion obtained by joining a pressing having a flat bottom, a sidewall symmetrical about an axis normal to said bottom and a curved portion linking said bottom to said sidewall, to a preformed cladding having a central portion for covering at least part of said curved portion, said press being of the type having a press jack for exerting pressure mounted on a fixed supporting frame and comprising, in combination, mandrel means for supporting said pressing and said cladding in a superposed relation, reciprocable by means of said jack, a block containing main inductor means, located above and coaxially with said mandrel means and fixedly secured to said frame, intermediate heating means of a ferromagnetic metal made of two separate parts, including a flat central part associated with the bottom face of said block, magnetically coupled to said main inductor means for heating and applying pressure to said central cladding portion, and an annular peripheral part having an inner face matching the shape of the outer face of the peripheral cladding portion, supplementary inductor means surrounding and magnetically coupled to said annular peripheral part for heating it, a sleeve member of electrically insulating material encompassing said block coaxially, spring means for displaceably coupling the upper end of said sleeve member to said frame, guide means for axially guiding the displacements of said sleeve member relatively to said frame, said sleeve member being arranged to carry at its lower end said annular peripheral part and said supplementary inductor means, and retaining means for determining the axially most distant position of said sleeve member relatively to said fixed block under the urging force of said spring means, to thereby obtain two different independent pressures exerted respectively on said central and said peripheral portion of said cladding by means of said press jack to facilitate the independent deformation of said peripheral cladding portion when heated and when said jack urges said mandrel against said block.

2. A brazing press as claimed in claim 1, wherein each of said spring means comprises a plurality of stacked elastic washer-type springs.

3. A brazing press as claimed in claim 1, wherein said guide means are made up from more than two holes and rods respectively slidably inserted inside said holes, respectively integral with the supporting frame and the axially displaceable sleeve member, said holes and rods being oriented in parallel to and disposed symmetrically relatively to the common axis of said mandrel, sleeve and block, and wherein said retaining means are made up from radial projections respectively secured to the free ends of said rods emerging from said holes.

4. A brazing press as claimed in claim 3, wherein said compression springs means are respectively assembled around said rods of said guide means for respectively bearing with their upper ends against said frame and with their lower ends against the top of said sleeve member.

5. A brazing press for assembling receptacles having a layered bottom portion obtained by joining a pressing having a flat bottom, a sidewall symmetrical about an axis normal to said bottom and a curved portion linking said bottom to said sidewall, to a preformed cladding having a central portion for covering said bottom and a peripheral portion for covering at least part of said curved portion, said press being of the type having a press jack mounted on a fixed supporting frame and comprising, in combination, mandrel means for supporting said pressing and said cladding in a superposed relation, reciprocable by means of said jack; a rigid block of electrically insulating material containing main inductor means, located above and coaxially with said mandrel means and coupled to said frame; intermediate heating means of a ferromagnetic material made of two separate parts, including a flat central part associated with the bottom face of said block, magnetically coupled to said main inductor means for heating and applying pressure to the respective central portions of said pressing and said cladding, and an annular, peripheral part having an inner face matching the shape of the outer face of the peripheral portion of said cladding for pressing it against the adjacent curved portion of said pressing; supplementary inductor means surrounding and magnetically coupled to said annular peripheral part for heating it; a sleeve member made at least in part of electrically insulating material, encompassing said block coaxially and having its upper end coupled to said frame for carrying at its lower end said annular peripheral part and said supplementary inductor means; spring means including at least one calibrated compression spring for displaceably coupling one of the elements comprising said sleeve member and said block to said frame while the other element is fixedly secured thereto; guide means including at least one sleeve and at least one rod slideably inserted within said sleeve and respectively fixed to said frame and to said displaceable element for axially guiding its displacements relative to said frame; and retaining means including at least one projection secured to the free end of said at least one rod emerging from said at least one sleeve for determining the axially most distant position of said displaceable element relatively to the fixed one under the urging force of said spring means, to thereby obtain two different independent pressures exerted respectively on said central and said peripheral portions of said cladding by means of said press jack to facilitate the independent deformation of said peripheral portion when heated and when said jack urges said mandrel against said block and said sleeve member.

6. A brazing press as claimed in claim 5, in which said spring means comprise more than two calibrated springs disposed between the upper end of said sleeve member and said frame, symmetrically relatively to the common axis of said mandrel, block and sleeve member, said block being fixed to said supporting frame.

7. A brazing press as claimed in claim 5, wherein each of said compression spring means comprises a plurality of stacked washer-type springs.

8. A brazing press as claimed in claim 5, in which said spring means is disposed between said block and said frame, symmetrically relatively to the common axis of said mandrel, block and sleeve member, said sleeve member being fixed to said frame, to obtain thereby, after brazing, immediate ejection of the receptacle from said peripheral part of said intermediate heating means encircling the curved peripheral portion of said cladding, when said mandrel is drawn away from said block which follows the downward travel of said mandrel until retained by said retaining means.

9. A brazing press as claimed in claim 8, wherein said compression spring means are assembled around said at least one sleeve of said guide means for respectively bearing with their upper end against said frame and with their lower end, against the top of said block.

10. A brazing press as claimed in claim 8, in which said sleeve member includes an upper electrically insulating part which is attached at its top to the frame of the press and a lower part made of a metal alloy of low thermal conductivity, which carries said annular, peripheral part, the two parts of the sleeve being fixed to one another, said lower metal part forming a closed short-circuited girdle around the main inductor.

11. A brazing press as claimed in claim 10, wherein said alloy is an alloy of nickel and at least one other metal selected from the group comprising chromium, iron and molybdenum.

12. A brazing press as claimed in claim 11, wherein said alloy consists of nickel, chromium and iron, of the type of the alloy which is sold under the name "Inconel" (registered trade mark).

13. A brazing press as claimed in claim 10, wherein said girdle contains vertically oriented oblong cut-outs which restrict the path of the induced currents to desired areas.

14. A brazing press as claimed in claim 10, wherein the lower metal part carries, brazed to it in the region of its contact with the bottom of the upper part, a metal tube conveying a cooling fluid.

15. A brazing press as claimed in claim 8, wherein the block containing the main inductor comprises a body made of a refractory cement.

16. A brazing press as claimed in claim 15, wherein the sidewall of the refractory cement body is encircled by a jacket of resinous electrically insulating material.

17. A brazing press as claimed in claim 8, wherein said block containing the main inductor further comprises an outer protective metal jacket surrounding at least the lower portion of its sidewall adjacent ot the inner circumference of the annular peripheral part of said intermediate heating means, said metal jacket being split over its entire height by a slot parallel to the common axis of said mandrel means, said block and said sleeve member, whereby to protect said block sidewall against heat radiation emitted by said inner circumference of the peripheral part of the heating means, when the block is in its lower position.

18. A brazing press as claimed in claim 17, wherein the outer protective jacket is made of a metallic material of high thermal conductivity.

19. A brazing press as claimed in claim 17, wherein at least one external metal tubing for conveying an insulating cooling fluid is secured into intimate contact with the outer face of said metal jacket, said tubing being connected to a circuit conveying this fluid by means of flexible pipes made of an electrically insulating material.

20. A brazing press as claimed in claim 19, wherein the external tubing is of serpentine shape and made of the same material as the metal jacket, is brazed to the outer face of said metal jacket, and extends over a predetermined part of its height.

21. A brazing press as claimed in claim 17, wherein the outer metal jacket is also provided with a plurality of so-called partial slots forming narrow crenellations substantially uniformly distributed around its circumference and extending from the both of its ends, whereby to reduce eddy current losses therein.

22. A brazing press as claimed in claim 17, wherein the block comprises a body of refractory cement cast directly into the metal jacket.

23. A brazing press as claimed in claim 22, wherein the outer metal jacket is made of a refractory metallic material.

24. A brazing press as claimed in claim 19, wherein the block whose body is made of resinous material having low thermal resistance, further comprises a protecting plate of a thermally and electrically insulating refractory material inserted between the bottom face of said body and the top face of the flat central part of said intermediate heating means, whereby to protect said bottom face from the heat developed in said central part.

25. A brazing press as claimed in claim 24, wherein said protecting plate is made of a machinable vitroceramic material having a thickness greater than ten millimeters but less than the distance separating the bottom tangent plane of the main inductor from the top face of said flat central part.

* * * * *